(12) United States Patent
Suzuki et al.

(10) Patent No.: US 9,624,346 B2
(45) Date of Patent: Apr. 18, 2017

(54) RESIN COMPOSITION, RESIN MOLDED ARTICLE, AND METHODS RESPECTIVELY FOR PRODUCING THESE PRODUCTS

(71) Applicant: KANEKA CORPORATION, Osaka-shi (JP)

(72) Inventors: Noriyuki Suzuki, Settshu (JP); Tetsuya Minami, Settsu (JP)

(73) Assignee: KANEKA CORPORATION, Osaka-shi (JP)

( * ) Notice: Subject to any disclaimer, the term of this patent is extended or adjusted under 35 U.S.C. 154(b) by 0 days.

(21) Appl. No.: 14/761,811

(22) PCT Filed: Dec. 12, 2013

(86) PCT No.: PCT/JP2013/007337
§ 371 (c)(1),
(2) Date: Jul. 17, 2015

(87) PCT Pub. No.: WO2014/112008
PCT Pub. Date: Jul. 24, 2014

(65) Prior Publication Data
US 2015/0353707 A1   Dec. 10, 2015

(30) Foreign Application Priority Data

Jan. 18, 2013 (JP) .................................. 2013-007039

(51) Int. Cl.
| | | |
|---|---|---|
| *C08J 3/20* | (2006.01) | |
| *B29C 45/00* | (2006.01) | |
| *C08K 5/05* | (2006.01) | |
| *C08L 67/04* | (2006.01) | |
| *C08L 101/00* | (2006.01) | |
| *C08J 3/22* | (2006.01) | |
| *C08K 5/053* | (2006.01) | |
| *B29K 67/00* | (2006.01) | |
| *B29L 31/00* | (2006.01) | |

(52) U.S. Cl.
CPC .............. *C08J 3/20* (2013.01); *B29C 45/0001* (2013.01); *C08J 3/226* (2013.01); *C08K 5/053* (2013.01); *C08L 67/04* (2013.01); *C08L 101/00* (2013.01); *B29K 2067/06* (2013.01); *B29L 2031/00* (2013.01); *C08J 2367/04* (2013.01); *C08J 2467/04* (2013.01); *C08K 2201/005* (2013.01)

(58) Field of Classification Search
CPC ........ C08J 3/20; B29C 45/0001; C08K 5/053; C08K 2067/06; C08K 2201/005; C08L 67/04; C08L 101/00; C08L 2031/00

USPC .......................................................... 524/387
See application file for complete search history.

(56) References Cited

U.S. PATENT DOCUMENTS

| | | | | |
|---|---|---|---|---|
| 5,681,879 A | * | 10/1997 | Yamamoto ........... | C08K 5/0066 524/281 |
| 6,127,512 A | * | 10/2000 | Asrar ....................... | C08K 3/22 528/271 |
| 7,384,766 B2 | | 6/2008 | Maruyama | |
| 2007/0049667 A1 | * | 3/2007 | Kim ....................... | C08K 5/053 524/127 |
| 2007/0049701 A1 | * | 3/2007 | Kim ....................... | C08K 5/053 525/438 |
| 2007/0049702 A1 | * | 3/2007 | Kim ....................... | C08K 5/053 525/438 |
| 2008/0033077 A1 | * | 2/2008 | Hashimoto ............. | C08L 51/04 524/9 |
| 2009/0275678 A1 | * | 11/2009 | Kumazawa ............. | C08L 67/00 523/523 |
| 2011/0293938 A1 | | 12/2011 | Takita et al. | |
| 2012/0149837 A1 | * | 6/2012 | Kumazawa ............. | C08L 67/00 524/605 |

FOREIGN PATENT DOCUMENTS

| | | |
|---|---|---|
| JP | 08-073711 A | 3/1996 |
| JP | 08-073713 A | 3/1996 |
| JP | 2001- 170985 A | 6/2001 |
| JP | 2007-231184 A | 9/2007 |
| JP | 2008-031439 A | 2/2008 |
| JP | 2008-280503 A | 11/2008 |
| JP | 2009-506191 A | 2/2009 |
| JP | 2009-132851 A | 6/2009 |
| JP | 2009-155478 A | 7/2009 |
| JP | 2009-155479 A | 7/2009 |
| JP | 2012-177011 A | 9/2012 |
| WO | WO 2008/099586 A1 | 8/2008 |
| WO | WO 2010/067543 A1 | 6/2010 |

OTHER PUBLICATIONS

U.S. Appl. No. 14/767,144, filed Aug. 11, 2015, Minami et al.
International Search Report issued Feb. 4, 2014, in PCT/JP2013/007337, filed Dec. 12, 2013.

* cited by examiner

*Primary Examiner* — Michael M Bernshteyn
(74) *Attorney, Agent, or Firm* — Oblon, McClelland, Maier & Neustadt, L.L.P.

(57) ABSTRACT

A resin composition, which can achieve the crystallization effect of pentaerythritol, is provided with good workability. The resin composition includes a thermoplastic resin (A) and pentaerythritol particles (B), wherein 70% or more of the pentaerythritol particles (B) have a particle diameter of 100 μm or less.

20 Claims, No Drawings

RESIN COMPOSITION, RESIN MOLDED ARTICLE, AND METHODS RESPECTIVELY FOR PRODUCING THESE PRODUCTS

TECHNICAL FIELD

The present invention provides a resin composition having improved molding processability and stability of mechanical properties.

BACKGROUND ART

In recent years, biodegradable plastics have been actively developed as materials that can solve problems caused by plastic waste that places a heavy burden on the global environment, such as impact on the ecosystem, generation of harmful gases during combustion, and global warming due to a large amount of heat generated by combustion.

In particular, carbon dioxide generated by combustion of plant-derived biodegradable plastics was originally present in the air, and therefore the amount of carbon dioxide in the air does not increase. This is referred to as carbon neutral, and is regarded as important under the Kyoto Protocol that sets carbon dioxide reduction targets. For this reason, biodegradable plastics have been expected to be actively used.

Recently, from the viewpoint of biodegradability and carbon neutral, aliphatic polyester resins, especially polyhydroxyalkanoate (hereinafter, sometimes referred to as PHA) resins have received attention as plant-derived plastics. Among PHA resins, for example, poly(3-hydroxybutyrate) homopolymer resins (hereinafter, sometimes referred to as P3HB), poly(3-hydroxybutyrate-co-3-hydroxyvalerate) copolymer resins (hereinafter, sometimes referred to as P3HB3HV), poly(3-hydroxybutyrate-co-3-hydroxyhexanoate) copolymer resins (hereinafter, sometimes referred to as P3HB3HH), poly(3-hydroxybutyrate-co-4-hydroxybutyrate) copolymer resins (hereinafter, sometimes referred to as P3HB4HB), and polylactic acid (hereinafter, sometimes referred to as PLA) have received attention.

However, the above aliphatic polyester resins such as PHA resins are known to have a low crystallization speed. Therefore, the aliphatic polyester resins require a long cooling time for solidification after heat melting in molding processing and have a problem that molding processability and productivity are poor.

Therefore, it has heretofore been proposed that an additive, such as boron nitride, titanium oxide, talc, sugar alcohol, polyvinyl alcohol, chitin, or chitosan, is added as a crystal nucleating agent to improve the crystallization of a PHA resin (see, for example, Patent Literature 1).

CITATION LIST

Patent Literature

PTL 1: WO 2008/099586 A

SUMMARY OF INVENTION

Technical Problem

However, an additive that is practically effective as a crystal nucleating agent for PHA resins has not yet been found.

Under the circumstances, the present inventors have found that pentaerythritol is extremely effective at crystallizing a PHA resin.

However, pentaerythritol is less likely to be uniformly dispersed in a PHA resin. Therefore, there is a problem that the production of a molding resin composition containing a PHA resin and pentaerythritol requires melt-kneading at high temperature and thus workability is reduced.

Under the circumstances, it is an object of the present invention to provide a resin composition, which can achieve the crystallization effect of pentaerythritol, with good workability.

Solution to Problem

The present inventors have found that in a resin composition containing a thermoplastic resin and pentaerythritol, the pentaerythritol can be uniformly and finely dispersed in the thermoplastic resin by allowing the pentaerythritol to be contained in the form of microparticles in the thermoplastic resin, which makes it possible to produce a molding resin composition with good workability while achieving the crystallization effect of the pentaerythritol.

More specifically, the present invention relates to a resin composition comprising: a thermoplastic resin (A); and pentaerythritol particles (B), wherein 70% or more of the pentaerythritol particles (B) have a particle diameter of 100 µm or less.

In the present invention, the thermoplastic resin (A) is preferably an aliphatic polyester resin, more preferably a polyhydroxyalkanoate, even more preferably one or more selected from the group consisting of poly(3-hydroxybutyrate), poly(3-hydroxybutyrate-co-3-hydroxyvalerate), poly(3-hydroxybutyrate-co-3-hydroxyvalerate-co-3-hydroxyhexanoate), poly(3-hydroxybutyrate-co-3-hydroxyhexanoate), poly(3-hydroxybutyrate-co-4-hydroxybutyrate), polylactic acid, polybutylene succinate, polybutylene succinate adipate, and polyethylene succinate.

The present invention also relates to a molding resin composition obtained by mixing the above resin composition with a thermoplastic resin (C). The thermoplastic resin (C) is preferably at least one selected from the group consisting of an aromatic polyester and an aliphatic polyester, more preferably a polyhydroxyalkanoate.

The present invention also relates to a method for producing the above resin composition, comprising the step of melt-kneading the thermoplastic resin (A) and a raw material of the pentaerythritol particles (B) at 170° C. or higher and then cooling the melt-kneaded thermoplastic resin (A) and a raw material of the pentaerythritol particles (B).

The present invention also relates to a method for producing the above resin composition, comprising the step of mixing the thermoplastic resin component (A) and the pentaerythritol particles (B).

The present invention also relates to a method for producing a molded article comprising the above molding resin composition, the method comprising the step of directly feeding a mixture containing the above resin composition and the thermoplastic resin (C) into a molding machine to mold the mixture.

The present invention is also directed to a resin molded article obtained by molding the above resin composition.

Advantageous Effects of Invention

The resin composition according to the present invention can be used as a masterbatch resin composition, and can also be used as a molding resin composition.

When the resin composition according to the present invention is used as a masterbatch resin composition, a molding resin composition having a predetermined pentaerythritol content can be easily obtained by mixing the masterbatch resin composition containing a high concentration of pentaerythritol with a thermoplastic resin in an appropriately adjusted ratio therebetween. This eliminates the necessity to previously prepare various molding resin compositions different in pentaerythritol content.

Further, it is not always necessary to perform melt-kneading in the production of a molding resin composition, and therefore workability is excellent. For this reason, a molding resin composition containing pentaerythritol at an appropriately-adjusted concentration can be efficiently obtained.

Also when the resin composition according to the present invention is used as a molding resin composition, it is not always necessary to perform melt-kneading in the production of the molding resin composition, and therefore workability is excellent. For this reason, a molding resin composition containing pentaerythritol at a desired concentration can be efficiently obtained.

According to the above methods, it is possible to uniformly and finely disperse pentaerythritol in a resin. As a result, it is possible to efficiently achieve the effects of pentaerythritol addition such as the effect of improving molding processability and the effect of inhibiting a temporal change in the mechanical properties of a molded article.

DESCRIPTION OF EMBODIMENTS

Hereinbelow, the present invention will be described in more detail.

A resin composition according to the present invention contains a thermoplastic resin (A) and pentaerythritol particles (B).

<(A) Thermoplastic Resin>

The thermoplastic resin (A) used in the resin composition according to the present invention is not particularly limited, and examples of the thermoplastic resin (A) include: aromatic polyesters such as poly(tetramethylenesuccinate-co-terephthalate), poly(ethylenesuccinate-co-terephthalate), and poly(tetramethyleneadipate-co-terephthalate); and aliphatic polyesters such as PHA, polyethylene succinate, polybutylene succinate, polybutylene succinate adipate, polyethylene sebacate, polybutylene sebacate, polyhexamethylene sebacate, and polylactic acid. The thermoplastic resin (A) is preferably an aliphatic polyester because of excellent biodegradability, processability in kneading or the like, and high pentaerythritol dispersibility. Examples of the aliphatic polyester resin include PHA, polyethylene succinate, polybutylene succinate, polybutylene succinate adipate, and polylactic acid. Among them, PHA is particularly preferred because particularly high dispersibility is easily achieved. These thermoplastic resins (A) may be used singly or in combination of two or more of them.

The PHA used in the present invention is preferably an aliphatic polyester containing a repeating unit represented by the formula (1): [—CHR—CH$_2$—CO—O—] (wherein R is an alkyl group represented by C$_n$H$_{2n+1}$ and n is an integer of 1 or more but 15 or less).

The PHA is preferably a polymer resin containing 80 mol% or more of 3-hydroxybutyrate, more preferably a polymer resin containing 85 mol % or more of 3-hydroxybutyrate. The PHA is preferably produced by a microorganism. Specific examples of the PHA include poly(3-hydroxybutyrate) homopolymer resins, poly(3-hydroxybutyrate-co-3-hydroxypropionate) copolymer resins, poly(3-hydroxybutyrate-co-3-hydroxyvalerate) copolymer resins, poly(3-hydroxybutyrate-co-3-hydroxyhexanoate) copolymer resins, poly(3-hydroxybutyrate-co-3-hydroxyheptanoate) copolymer resins, poly(3-hydroxybutyrate-co-3-hydroxyoctanoate) copolymer resins, poly(3-hydroxybutyrate-co-3-hydroxynonanoate) copolymer resins, poly(3-hydroxybutyrate-co-3-hydroxydecanoate) copolymer resins, poly(3-hydroxybutyrate-co-3-hydroxyundecanoate) copolymer resins, poly(3-hydroxybutyrate-co-4-hydroxybutyrate) copolymer resins, poly(3-hydroxybutyrate-co-3-hydroxyvalerate-co-3-hydroxyhexanoate) copolymer resins. Among them, from the viewpoint of molding processability and molded article physical properties, poly(3-hydroxybutyrate) homopolymer resins, poly(3-hydroxybutyrate-co-3-hydroxyvalerate) copolymer resins, poly(3-hydroxybutyrate-co-3-hydroxyvalerate-co-3-hydroxyhexanoate) copolymer resins, poly(3-hydroxybutyrate-co-3-hydroxyhexanoate) copolymer resins, and poly(3-hydroxybutyrate-co-4-hydroxybutyrate) copolymer resins can be suitably used.

From the viewpoint of molding processability, molded article quality, etc., the ratio between 3-hydroxybutyrate (hereinafter, sometimes referred to as 3HB) and a comonomer copolymerized therewith (e.g., 3-hydroxyvalerate (hereinafter, sometimes referred to as 3HV), 3-hydroxyhexanoate (hereinafter, sometimes referred to as 3HH), 4-hydroxybutyrate (hereinafter, sometimes referred to as 4HB)) constituting the PHA, that is, the ratio between monomers in the copolymer resin is preferably 3-hydroxybutyrate/comonomer=97/3 to 80/20 (mol %/mol %), more preferably 95/5 to 85/15 (mol %/mol %). If the ratio of the comonomer is less than 3 mol %, there is a possibility that a molding processing temperature is close to a pyrolysis temperature and thus molding processing is difficult. If the ratio of the comonomer exceeds 20 mol %, there is a possibility that the PHA is slowly crystallized and thus productivity is poor.

The ratio between individual monomers in the copolymer resin as the PHA can be measured by gas chromatography in the following manner. Two milliliters of a mixed solution of sulfuric acid and methanol (sulfuric acid/methanol=15/85 (weight ratio)) and 2 mL of chloroform are added to about 20 mg of the dry PHA, and the resulting mixture is hermetically sealed and heated at 100° C. for 140 minutes to obtain a methyl ester of a PHA degradation product. After cooling, 1.5 g of sodium hydrogen carbonate is added thereto little by little for neutralization, and the resulting mixture is allowed to stand until the generation of carbon dioxide is stopped. Then, 4 mL of diisopropyl ether is added to and well mixed with the mixture, and then the monomer unit composition of the PHA degradation product in a supernatant is analyzed by capillary gas chromatography to determine the ratio between individual monomers in the copolymer resin.

The gas chromatography is performed using a gas chromatograph "GC-17A" manufactured by SHIMADZU CORPORATION and a capillary column "NEUTRA BOND-1" (column length: 25 m, column inner diameter: 0.25 mm, liquid film thickness: 0.4 µm) manufactured by GL Sciences Inc. Helium gas is used as a carrier gas, a column inlet pressure is 100 kPa, and the amount of a sample injected is 1 µL. Temperature conditions are as follows: temperature rise is performed at a rate of 8° C./min from an initial temperature of 100° C. to 200° C., and temperature rise is further performed at a rate of 30° C./min from 200 to 290° C.

The weight-average molecular weight (hereinafter, sometimes referred to as Mw) of the PHA used in the present invention is preferably 200000 to 2500000, more preferably 250000 to 2000000, even more preferably 300000 to 1000000. If the weight-average molecular weight is less than 200000, there is a possibility that mechanical properties etc. are poor. If the weight-average molecular weight exceeds 2500000, there is a possibility that molding processing is difficult.

The weight-average molecular weight is measured by gel permeation chromatography using a gel permeation chromatograph ("Shodex GPC-101" manufactured by Showa Denko K.K.), a polystyrene gel column ("Shodex K-804" manufactured by Showa Denko K.K.), and chloroform as a mobile phase. The weight-average molecular weight can be determined as a molecular weight based on polystyrene standards. In this case, a calibration curve is prepared using polystyrene standards with weight-average molecular weights of 31400, 197000, 668000, and 1920000.

It is to be noted that the PHA is produced by, for example, a microorganism such as *Alcaligenes eutrophus* AC32 strain obtained by introducing a PHA synthetase gene derived from *Aeromonas caviae* into *Alcaligenes eutrophus* (International Deposit under Budapest Treaty, International Depository Authority: National Institute of Technology and Evaluation Patent Mircoorganisms Depositary (6 Chuo, 1-1-1, Higashi, Tsukuba, Ibaraki, Japan), Date of Original Deposit: Aug. 12, 1996, transferred on Aug. 7, 1997, Deposit Number: FERM BP-6038 (transferred from original deposit FERM P-15786)) (J. Bacteriol., 179, 4821 (1997)).

<(B) Pentaerythritol>

The resin composition according to the present invention contains pentaerythritol as a crystal nucleating agent for the thermoplastic resin (A).

The pentaerythritol is a compound represented by the following formula (2).

[Chemical formula 1]

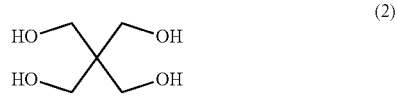

(2)

The pentaerythritol is one of polyhydric alcohols, and is a white crystalline organic compound having a melting point of 260.5° C. The pentaerythritol is classified as a sugar alcohol, but is not derived from a natural product and can be synthesized by condensation of acetaldehyde and formaldehyde in a basic condition.

The pentaerythritol used in the present invention is not particularly limited, and may be a commonly-available one such as a reagent or an industrial product. Examples of the reagent include, but are not limited to, those manufactured by Wako Pure Chemical Industries, Ltd., Sigma-Aldrich, Tokyo Chemical Industry Co., Ltd., and Merck. Examples of the industrial product include, but are not limited to, those manufactured by KOEI CHEMICAL CO., LTD. (product name: Pentarit) and TOYO CHEMICALS CO., LTD.

Some commonly-available reagents and industrial products contain, as an impurity, an oligomer such as dipentaerythritol or tripentaerythritol generated by dehydration condensation of pentaerythritol. The oligomer does not have the effect of crystallizing the thermoplastic resin, but does not inhibit the crystallization effect of the pentaerythritol. Therefore, the pentaerythritol used in the present invention may contain the oligomer.

In the present invention, the pentaerythritol is contained in the resin composition in the form of microparticles. Seventy percent or more (preferably 80% or more, more preferably 90% or more, even more preferably 95% or more) of the total pentaerythritol particles contained in the resin composition preferably have a particle diameter of 100 μm or less. When the resin composition contains the pentaerythritol in the form of such microparticles, the pentaerythritol can be uniformly and finely dispersed in the resin. Therefore, it is not always necessary to perform melt-kneading in the production of a molding resin composition. This is because the pentaerythritol is contained in the form of microparticles, the crystallization effect of the pentaerythritol can be achieved without performing melt-kneading when a molded article is formed.

The ratio of the pentaerythritol particles having a particle diameter of 100 μm or less used in the present invention can be determined using image analysis software ("Win Roof" manufactured by MITANI CORPORATION).

Further, the particle diameter of the pentaerythritol can be determined by visually observing the surface of pellets with an optical microscope.

In order to obtain the effect of the pentaerythritol as a crystal nucleating agent, the lower limit of the amount of the pentaerythritol is preferably 0.05 parts by weight, more preferably 0.1 parts by weight, even more preferably 0.5 parts by weight with respect to 100 parts by weight of the total resin content of a molding resin composition. If the amount of the pentaerythritol is too large, there is a possibility that processing is difficult due to a reduced viscosity during melt processing. Therefore, the upper limit of the amount of the pentaerythritol is preferably 12 parts by weight, more preferably 10 parts by weight, even more preferably 8 parts by weight with respect to 100 parts by weight of the total resin content of a molding resin composition.

<Resin Composition>

Examples of a method for producing such a resin composition containing pentaerythritol in the form of microparticles include: a method in which the thermoplastic resin (A) and a raw material of the pentaerythritol particles (B) (pentaerythritol that does not satisfy the above upper limit of microparticles) are mixed by melt-kneading at a high temperature of 170° C. or higher and then cooled; and a method in which pentaerythritol in the form of microparticles is previously prepared by a method such as grinding or commercially-available pentaerythritol is obtained, and is then mixed with the thermoplastic resin by melt-kneading or a mixing method other than melt-kneading. It is considered that in the method in which melt-kneading is performed at a temperature of 170° C. or higher, the pentaerythritol is once softened during melt-kneading and is then deposited as microparticles in the thermoplastic resin in a cooling process after melt-kneading and thus a resin composition containing pentaerythritol in the form of microparticles is formed.

(Masterbatch Resin Composition)

The resin composition according to the present invention will be described with reference to a case where it is used as a masterbatch resin composition.

The lower limit of the amount of the pentaerythritol particles contained in the masterbatch resin composition according to the present invention is 15 parts by weight, preferably 20 parts by weight, more preferably 25 parts by weight with respect to 100 parts by weight of the thermoplastic resin. If the amount of the pentaerythritol particles contained in the masterbatch resin composition according to the present invention is less than 15 parts by weight, there is a case where a dilution factor used to form a molding resin composition by mixing with a thermoplastic resin later is reduced and thus the use of the masterbatch is virtually ineffective. On the other hand, if the amount of the pentaerythritol is too large, there is a possibility that the dispersibility of the pentaerythritol is impaired and thus the crystallization effect of the pentaerythritol is impaired. Therefore, the upper limit of the amount of the pentaerythritol particles contained in the masterbatch resin composition according to the present invention is 400 parts by weight, preferably 300 parts by weight, more preferably 200 parts by weight with respect to 100 parts by weight of the thermoplastic resin.

In the case of using as a masterbatch resin composition, the resin composition according to the present invention can be produced by an apparatus that can heat the thermoplastic resin (A) to its melting point or higher so that the thermoplastic resin (A) and the pentaerythritol particles (B) can be uniformly mixed. Here, the phrase "uniformly mixed" means a state where particles of the resin are not observed when the surface of the resulting mixture is visually observed. In order to increase the uniformity of the mixture, the heating temperature of the resin is preferably high. For example, the heating temperature of the resin is preferably 170° C. or higher but the decomposition temperature of the resin or lower.

As the apparatus that can achieve uniform mixing, any known melt-kneading machine such as an extruder, a roll mill, or a Banbury mixer can be used. More specifically, a method can be used in which the thermoplastic resin, the pentaerythritol, and if necessary, another modifier are melt-kneaded by a melt-kneading machine to form pellets. The thermoplastic resin and the pentaerythritol may be added to the melt-kneading machine at the same time, or the thermoplastic resin may be first melted and then mixed and kneaded with the pentaerythritol.

(Molding Resin Composition)

A molding resin composition can be produced by mixing the above masterbatch resin composition with a thermoplastic resin.

Such a molding resin composition obtained by mixing a resin composition with a thermoplastic resin (C) is preferred from the viewpoint that a predetermined pentaerythritol content of the molding resin composition can be easily achieved by previously preparing a pentaerythritol-rich resin composition and then mixing the resin composition with a thermoplastic resin (C). The molding resin composition is particularly suitable for film molding or sheet molding.

The thermoplastic resin (C) used in the molding resin composition according to the present invention is not particularly limited. When the thermoplastic resin (C) used in the masterbatch resin composition is, for example, an aromatic polyester such as poly(tetramethylenesuccinate-co-terephthalate), poly(ehtylenesuccinate-co-terephthalate), or poly(tetramethyleneadipate-co-terephthalate) or an aliphatic polyester such as PHA, polyethylene succinate, polybutylene succinate, polybutylene succinate adipate, polyethylene sebacate, polybutylene sebacate, polyhexamethylene sebacate, or polylactic acid, from the viewpoint of miscibility with such a thermoplastic resin, the thermoplastic resin (C) used in the molding resin composition is preferably an aromatic polyester such as poly(tetramethylenesuccinate-co-terephthalate), poly(ethylenesuccinate-co-terephthalate), or poly(tetramethyleneadipate-co-terephthalate) or an aliphatic polyester such as PHA, polyethylene succinate, polybutylene succinate, polybutylene succinate adipate, polyethylene sebacate, polybutylene sebacate, polyhexamethylene sebacate, or polylactic acid. The thermoplastic resin (C) is particularly preferably PHA because the pentaerythritol is likely to be well dispersed therein.

These thermoplastic resins (C) may be used singly or in combination of two or more of them. Further, the thermoplastic resin (C) may be the same as the thermoplastic resin (A) contained in the masterbatch resin composition. Alternatively, both the thermoplastic resins may be different from each other.

The mixing ratio between the thermoplastic resin (C) and the masterbatch resin composition is not particularly limited. The mixing ratio between the thermoplastic resin (C) and the masterbatch resin composition may be appropriately determined depending on the pentaerythritol content of the resulting molding resin composition.

The pentaerythritol content of the molding resin composition varies depending on the intended use of a molded article and a molding method used. However, in order to obtain the effect of the pentaerythritol as a crystal nucleating agent, the lower limit of the amount of the pentaerythritol is preferably 0.05 parts by weight, more preferably 0.1 parts by weight, even more preferably 0.5 parts by weight with respect to 100 parts by weight of the total resin content of the molding resin composition. If the amount of the pentaerythritol is too large, there is a possibility that processing is difficult due to a reduced viscosity during melt processing. Therefore, the upper limit of the amount of the pentaerythritol is preferably 12 parts by weight, more preferably 10 parts by weight, even more preferably 8 parts by weight with respect to 100 parts by weight of the total resin content of the molding resin composition.

Hereinbelow, a method for producing the molding resin composition using the masterbatch resin composition will be described.

The masterbatch resin composition according to the present invention, the thermoplastic resin (C), and if necessary, another additive such as a plasticizer, an antioxidant, or a lubricant are uniformly mixed by a mixing machine to form pellets. At this time, a melt-kneading machine may be used as the mixing machine, and a mixing machine other than a melt-kneading machine may also be used. Then, the obtained pellets are subjected to injection molding, extrusion molding using an extruder equipped with a T-die, tubular molding using an extruder equipped with a circular die, film inflation molding or the like, and then, if necessary, stretching is further performed. In this way, the molding resin composition according to the present invention can be obtained.

<Molded Article>

Hereinbelow, a molded article according to the present invention will be described.

The molded article according to the present invention may be produced by mixing the masterbatch resin composition with the thermoplastic resin (C) in such a manner as described above, or may be directly produced by mixing the thermoplastic resin (A) and the pentaerythritol without using the masterbatch resin composition.

The resin composition according to the present invention is excellent in the dispersibility of the pentaerythritol, and therefore does not need to be previously kneaded. The molded article according to the present invention can be produced through a step in which a mixture containing the resin composition according to the present invention and the thermoplastic resin (C) is directly fed into a molding machine and molded. As a result, damage such as degeneration of the resin of the molded article can be reduced.

The types of the thermoplastic resin and the pentaerythritol used here and the pentaerythritol content are the same as those described above.

When the molded article according to the present invention is produced without using the masterbatch resin composition, as described above, a method can be used in which the thermoplastic resin and pentaerythritol are mixed by melt-kneading at a high temperature of 170° C. or higher and then cooled, or a method can be used in which pentaerythritol in the form of microparticles is previously prepared by a method such as grinding or commercially-available pentaerythritol is obtained, and is then mixed with the thermoplastic resin by melt-kneading or a mixing method other than melt-kneading. Then, pellets obtained by such a method are subjected to injection molding, extrusion molding using an extruder equipped with a T-die, tubular molding using an extruder equipped with a circular die, film inflation molding or the like, and then, if necessary, stretching is further performed. In this way, the molded article according to the present invention can be obtained.

The molded article according to the present invention can be appropriately used in the fields of agriculture, fishery, forestry, gardening, medicine, sanitary goods, food industry, clothing, non-clothing, packaging, cars, building materials, etc.

EXAMPLES

Hereinbelow, the present invention will be described specifically with reference to the following examples, but the technical scope of the present invention is not limited to these examples.

Polyhydroxyalkanoate as Raw Material A1:

Culture production was performed using KNK-005 strain (see U.S. Pat. No. 7,384,766).

The composition of a seed medium was as follows: 1 w/v % Meat-extract, 1 w/v % Bacto-Tryptone, 0.2 w/v % Yeast-extract, 0.9 w/v % $Na_2HPO_4.12H_2O$, and 0.15 w/v % $KH_2PO_4$ (pH 6.8).

The composition of a preculture medium was as follows: 1.1 w/v % $Na_2HPO_4.12H_2O$, 0.19 w/v % $KH_2PO_4$, 1.29 w/v % $(NH_4)_2SO_4$, 0.1 w/v % $MgSO_4.7H_2O$, and 0.5 v/v % trace metal salt solution (obtained by dissolving, in 0.1 N hydrochloric acid, 1.6 w/v % $FeCl_3.6H_2O$, 1 w/v % $CaCl_2.2H_2O$, 0.02 w/v % $CoCl_2.6H_2O$, 0.016 w/v % $CuSO_4.5H_2O$, and 0.012 w/v % $NiCl_2.6H_2O$). As a carbon source, palm oil was added at a time at a concentration of 10 g/L.

The composition of a PHA production medium was as follows: 0.385 w/v % $Na_2HPO_4.12H_2O$, 0.067 w/v % $KH_2PO_4$, 0.291 w/v % $(NH_4)_2SO_4$, 0.1 w/v % $MgSO_4.7H_2O$, 0.5 v/v % trace metal salt solution (obtained by dissolving, in 0.1 N hydrochloric acid, 1.6 w/v % $FeCl_3.6H_2O$, 1 w/v % $CaCl_2.2H_2O$, 0.02 w/v % $CoCl_2.6H_2O$, 0.016 w/v % $CuSO_4.5H_2O$, and 0.012 w/v % $NiCl_2.6H_2O$), and 0.05 w/v % BIOSPUREX200K (defoaming agent: manufactured by Cognis Japan Ltd.).

First, a glycerol stock (50 µL) of KNK-005 strain was inoculated into the seed medium (10 mL) and seed-cultured for 24 hours. Then, the resulting seed culture was inoculated at 1.0 v/v % into 1.8 L of the preculture medium contained in a 3-liter jar fermenter (MDL-300 model manufactured by B. E. MARUBISHI Co., Ltd.). The jar fermenter was operated under conditions where a culture temperature was 33° C., a stirring speed was 500 rpm, and a ventilation volume of 1.8 L/min to perform preculture for 28 hours while pH was controlled to be in the range of 6.7 to 6.8. The pH control was performed using a 14% aqueous ammonium hydroxide solution.

Then, the resulting preculture was inoculated at 1.0 v/v % into 6 L of the production medium contained in a 10-liter jar fermenter (MDS-1000 model manufactured by B. E. MARUBISHI Co., Ltd.). The jar fermenter was operated under conditions where a culture temperature was 28° C., a stirring speed was 400 rpm, and a ventilation volume was 6.0 L/min while pH was controlled to be in the range of 6.7 to 6.8. The pH control was performed using a 14% aqueous ammonium hydroxide solution. As a carbon source, palm kernel olein oil was used. Culture was performed for 64 hours. After the completion of the culture, cells were collected by centrifugation, washed with methanol, and lyophilized to obtain dried cells, and the weight of the dried cells was measured.

Then, 100 mL of chloroform was added to 1 g of the obtained dried cells, and the resulting cell suspension was stirred at room temperature all day and night to extract PHA in the cells. Cell debris was removed by filtration, and then the resulting filtrate was concentrated in an evaporator until the total volume of the filtrate was reduced to 30 mL to obtain a concentrate. Then, 90 mL of hexane was added to the concentrate little by little, and the resulting mixture was allowed to stand for 1 hour while gently stirred. The deposited PHA was separated by filtration and vacuum-dried at 50° C. for 3 hours. In this way, PHA was obtained. The 3HH content of the obtained PHA was analyzed by gas chromatography measurement in the following manner. Two milliliters of a mixed solution of sulfuric acid and methanol (15:85) and 2 mL of chloroform were added to 20 mg of the dry PHA, and the resulting mixture was hermetically sealed and heated at 100° C. for 140 minutes to obtain a methyl ester of a PHA degradation product. After cooling, 1.5 g of sodium hydrogen carbonate was added thereto little by little for neutralization, and the resulting mixture was allowed to stand until the generation of carbon dioxide was stopped. Then, 4 mL of diisopropyl ether was added to and well mixed with the mixture, and then the resulting mixture was centrifuged to obtain a supernatant. Then, the monomer unit composition of the polyester degradation product in the supernatant was analyzed by capillary gas chromatography. The gas chromatography was performed using a gas chromatograph "GC-17A" manufactured by SHIMADZU CORPORATION and a capillary column "NEUTRA BOND-1" (column length: 25 m, column inner diameter: 0.25 mm, liquid film thickness: 0.4 µm) manufactured by GL Sciences Inc. Helium gas was used as a carver gas, a column inlet pressure was 100 kPa, and the amount of a sample injected was 1 µL. Temperature conditions were as follows: temperature rise was performed at a rate of 8° C./min from an initial temperature of 100° C. to 200° C., and temperature rise was further performed at a rate of 30° C./min from 200 to 290° C. As a result of the analysis performed under the above conditions, the PHA was found to be poly(3-hydroxybutyrate-co-3-hydroxyhexanoate) (P(3HB-co-3HH): PHBH) represented by the chemical formula (1). The 3-hydroxyhexanoate (3HH) content of the PHA was 5.6 mol %.

After the completion of the culture, PHBH was obtained from the resulting cell culture by a method described in WO 2010/067543. The weight-average molecular weight Mw of the PHBH as measured by GPC was 600000.

Polyester as Raw Material A4: A polybutylene succinate resin (product name: Bionolle 1020) manufactured by Showa Denko K.K. was used.

Examples 1 to 3

(Production of Masterbatch Resin Compositions B1 to B3)

The polyhydroxyalkanoate as Raw Material A1 of 100 parts by weight was uniformly mixed with pentaerythritol (manufactured by Wako Pure Chemical Industries, Ltd., ratio of particles with a particle diameter of 100 μm or less=23.9%) in an amount, expressed in parts by weight, shown in Table 1 by melt-kneading using a co-rotating intermeshing twin screw extruder (TEX30 manufactured by The Japan Steel Works, LTD.) under conditions of a preset temperature of 150° C. to 170° C. and a screw rotation speed of 150 rpm to obtain a masterbatch in which pentaerythritol microparticles were contained in the polyhydroxyalkanoate. The temperature of the resin during melt-kneading was measured by directly measuring the temperature of the melted resin extruded from a die of the twin screw extruder with a K-type thermocouple. The masterbatch was molded in the form of strand through a die, cut into pellets, and dried with dehumidified air at 80° C. for 4 hours.

(Measurement of Particle Diameter of Pentaerythritol in Masterbatch Resin Composition)

The particle diameter of the pentaerythritol in the masterbatch resin composition was measured by observing the surface of the pellets with an optical microscope at 200× to 400× magnification. More specifically, the ratio of the number of pentaerythritol particles having a particle diameter of 100 μm or less to the total number of pentaerythritol particles was calculated by analyzing an obtained micrograph using image analysis software ("Win Roof" manufactured by MITANI CORPORATION). The results are shown in Table 1.

TABLE 1

| | | | Examples | | |
|---|---|---|---|---|---|
| | | | 1 B1 | 2 B2 | 3 B3 |
| Raw Materials | Polyhydroxyalkanoate (A1) | Parts by weight | 100 | 100 | 100 |
| | Pentaerythritol | Parts by weight | 25 | 67 | 100 |
| Pentaerythritol Content | | wt % | 20 | 40 | 50 |
| Resin Temperature during Melt-Kneading | | ° C. | 182 | 186 | 186 |
| Ratio of Particles with Particle Diameter ≤ 100 μm | | % | 96.5 | 90.8 | 85.3 |

The ratio of pentaerythritol particles having a particle diameter of 100 μm or less before melt-kneading was 23.9%. However, as can be seen from Table 1, the pentaerythritol was finely dispersed in the resin by melt-kneading performed under conditions where the temperature of the resin was equal to or higher than the softening onset temperature (170° C.) of the pentaerythritol, and therefore 70% or more of the total pentaerythritol particles in the masterbatch had a particle diameter of 100 μm or less.

Examples 4 to 12

(Injection Molding)

The polyhydroxyalkanoate, which is a thermoplastic resin, as Raw Material A1 and each of the masterbatch resin compositions obtained in Examples 1 to 3 were mixed in a mixing ratio shown in Table 2 in a polyethylene bag at room temperature. The resulting mixture was fed into a hopper of an injection molding machine (IS-75E manufactured by TOSHIBA MACHINE CO., LTD.) and molded into dumbbell specimens in accordance with D-638 under conditions where the cylinder preset temperature of the molding machine was 120 to 150° C. and the preset temperature of a mold was 50° C. The temperature of the mold during molding was measured by using a K-type thermocouple.

(Releasability)

Molding processability was evaluated in terms of release time. The release time was defined as the time required for a molding resin composition injected into a mold to prepare a molded article to be released from the opened mold by ejecting the molded article with an ejection pin without deforming the molded article. The shorter release time means that crystallization is faster and molding processability is better and has improved. The results are shown in Table 2.

(Temporal Change in Mechanical Properties)

A temporal change in mechanical properties was evaluated in terms of tensile elongation at break. The dumbbell specimen obtained by injection molding was subjected to tensile measurement at 23° C. in accordance with ASTM D-638 to measure elongation at break. The measurement was performed 168 hours, 336 hours, 720 hours, and 1440 hours after the molding. A smaller change in the value of elongation at break means that mechanical properties are stabler and better. The results are shown in Table 2.

Comparative Examples 1 to 3

The polyhydroxyalkanoate as Raw Material A1 of 100 parts by weight was melt-kneaded with pentaerythritol (manufactured by Wako Pure Chemical Industries, Ltd., ratio of particles with a particle diameter of 100 μm or less=23.9%) in the same ratio as that of any one of Examples 4 to 12 using a co-rotating intermeshing twin screw extruder (TEX30 manufactured by The Japan Steel Works, LTD.) under conditions of a preset temperature of 120° C. to 140° C. and a screw rotation speed of 100 rpm to obtain a resin composition. The resin composition was molded in the form of strand through a die, cut into pellets, and dried with dehumidified air at 80° C. for 4 hours.

The release time in injection molding and the temporal change in the mechanical properties of dumbbell specimens were measured in the same manner as in Example 4. The results are shown in Table 2.

TABLE 2

| | | | Examples | | | | | | | | | Comparative Examples | | |
|---|---|---|---|---|---|---|---|---|---|---|---|---|---|---|
| | | | 4 | 5 | 6 | 7 | 8 | 9 | 10 | 11 | 12 | 1 | 2 | 3 |
| Raw Materials | Polyhydroxyalkanoate (A1) | Parts by weight | 97.5 | 95 | 75 | 98.75 | 97.5 | 87.5 | 99 | 98 | 90 | | 100 | |
| | Masterbatch (B1) | Parts by weight | 2.5 | 5 | 25 | — | — | — | — | — | — | — | — | — |

TABLE 2-continued

|  |  |  | Examples | | | | | | | | | Comparative Examples | | |
|---|---|---|---|---|---|---|---|---|---|---|---|---|---|---|
|  |  |  | 4 | 5 | 6 | 7 | 8 | 9 | 10 | 11 | 12 | 1 | 2 | 3 |
|  | Masterbatch (B2) | Parts by weight | — | — | — | 1.25 | 2.5 | 12.5 | — | — | — | — | — | — |
|  | Masterbatch (B3) | Parts by weight | — | — | — | — | — | — | 1 | 2 | 10 | — | — | — |
|  | Original Pentaerythritol Particles | Parts by weight | — | — | — | — | — | — | — | — | — | 0.53 | 1.04 | 5.3 |
| Pentaerythritol Content of Final Resin Composition | | % | 0.5 | 1.0 | 5.0 | 0.5 | 1.0 | 5.0 | 0.5 | 1.0 | 5.0 | 0.5 | 1.0 | 5.0 |
| Ratio of Particles with Particle Diameter ≤100 μm | | % | 96.5 | 96.5 | 96.5 | 90.8 | 90.8 | 90.8 | 85.3 | 85.3 | 85.3 | 23.9 | 23.9 | 23.9 |
| Resin Temperature during Melt-Kneading | | °C. | — | — | — | — | — | — | — | — | — | 163 | 164 | 164 |
| Injection Molding | Mold Temperature | °C. | 51 | 51 | 52 | 51 | 51 | 52 | 51 | 51 | 52 | 51 | 51 | 52 |
|  | Release Time | Seconds | 22 | 20 | 15 | 23 | 21 | 16 | 23 | 22 | 17 | 21 | 20 | 15 |
| Tensile Elongation at Break | 168 hr after Molding | % | 16 | 16 | 15 | 16 | 16 | 15 | 16 | 16 | 15 | 17 | 16 | 15 |
|  | 336 hr after Molding |  | 16 | 16 | 15 | 16 | 16 | 15 | 15 | 15 | 15 | 17 | 16 | 15 |
|  | 720 hr after Molding |  | 15 | 15 | 14 | 15 | 15 | 14 | 15 | 15 | 14 | 17 | 15 | 14 |
|  | 1440 hr after Molding |  | 14 | 15 | 14 | 14 | 15 | 14 | 14 | 14 | 14 | 16 | 15 | 14 |

As can be seen from Table 2, the effect of pentaerythritol addition could be achieved simply by subjecting a mixture of the masterbatch resin composition containing a high concentration of pentaerythritol and the thermoplastic resin to secondary processing such as injection molding in spite of the fact that melt-kneading was not performed in the secondary processing.

Comparative Example 4

A resin composition having a pentaerythritol content of 40% was obtained in the same manner as in Example 2 except that the melt-kneading of the polyhydroxyalkanoate as Raw Material A1 and the pentaerythritol was performed under conditions of a preset temperature of 110 to 130° C. and a screw rotation speed of 50 rpm. The ratio of pentaerythritol particles having a particle diameter of 100 μm or less in the obtained resin composition was 45.3%.

TABLE 3

|  |  |  | Comparative Example 4 |
|---|---|---|---|
| Raw Materials | Polyhydroxyalkanoate (A1) | Parts by weight | 100 |
|  | Pentaerythritol | Parts by weight | 67 |
| Pentaerythritol Content | | wt % | 40 |
| Resin Temperature during Melt-Kneading | | °C. | 150 |
| Ratio of Particles with Particle Diameter ≤ 100 μm | | % | 45.3 |

Comparative Examples 5 to 7

The resin composition obtained in Comparative Example 4 and the polyhydroxyalkanoate as Raw Material A1 were mixed in a mixing ratio shown in Table 4, and the resulting mixture was directly subjected to injection molding and evaluations were made in the same manner as in Examples 4 to 12. The results are shown in Table 4.

TABLE 4

|  |  |  | Comparative Examples | | |
|---|---|---|---|---|---|
|  |  |  | 5 | 6 | 7 |
| Raw Materials | Polyhydroxyalkanoate (A1) | Parts by weight | 98.75 | 97.5 | 87.5 |
|  | Resin Composition Obtained in Comparative Example 4 | Parts by weight | 1.25 | 2.5 | 12.5 |
| Pentaerythritol Content of Final Resin Composition | | % | 0.5 | 1.0 | 5.0 |
| Ratio of Particles with Particle Diameter ≤ 100 μm in Final Resin Composition | | % | 45.3 | 45.3 | 45.3 |
| Injection Molding | Mold Temperature | °C. | 52 | 51 | 52 |
|  | Release Time | Seconds | 47 | 44 | 39 |
| Tensile Elongation at Break | 168 hr after Molding | % | 16 | 16 | 16 |
|  | 336 hr after Molding |  | 12 | 11 | 11 |
|  | 720 hr after Molding |  | 8 | 7 | 7 |
|  | 1440 hr after Molding |  | 7 | 7 | 7 |

As can be seen from Table 4, when the ratio of pentaerythritol particles having a particle diameter of 100 μm or less was less than 70%, the effect of pentaerythritol addition could not be obtained simply by mixing the resin as a main raw material with the pentaerythritol and directly feeding the resulting mixture into an apparatus for secondary processing such as injection molding.

Examples 13 and 14

Masterbatches B4 and B5 were prepared in the same manner as in Example 1 except that the pentaerythritol content was changed as shown in Table 5. In each of the masterbatches, 70% or more of the total pentaerythritol particles had a particle diameter of 100 μm or less.

TABLE 5

|  |  |  | Examples | |
|---|---|---|---|---|
|  |  |  | 13 B4 | 14 B5 |
| Raw Materials | Polyhydroxyalkanoate (A1) | Parts by weight | 100 | 100 |
|  | Pentaerythritol | Parts by weight | 5.3 | 11.2 |
| Pentaerythritol Content | | wt % | 5 | 10 |

TABLE 5-continued

| | | Examples | |
| --- | --- | --- | --- |
| | | 13 B4 | 14 B5 |
| Resin Temperature during Melt-Kneading | ° C. | 180 | 182 |
| Ratio of Particles with Particle Diameter ≤ 100 μm | % | 98.2 | 97.5 |

Examples 15 to 18

The polyhydroxyalkanoate as Raw Material A1 and the masterbatch B4 or B5 obtained in Example 13 or 14 were mixed in a mixing ratio shown in Table 6 and directly fed into an injection molding machine to evaluate injection molding processability in the same manner as in Example 4. The results are shown in Table 6.

TABLE 6

| | | | Examples | | | |
| --- | --- | --- | --- | --- | --- | --- |
| | | | 15 | 16 | 17 | 18 |
| Raw Materials | Polyhydroxyalkanoate (A1) | Parts by weight | 90 | 80 | 95 | 90 |
| | Masterbatch (B4) | Parts by weight | 10 | 20 | — | — |
| | Masterbatch (B5) | Parts by weight | — | — | 5 | 10 |
| Pentaerythritol Content of Final Resin Composition | | % | 0.5 | 1.0 | 0.5 | 1.0 |
| Ratio of Particles with Particle Diameter ≤100 μm | | % | 98.2 | 98.2 | 97.5 | 97.5 |
| Injection Molding | Mold Temperature | ° C. | 51 | 51 | 52 | 51 |
| | Release Time | Seconds | 21 | 20 | 21 | 20 |

As can be seen from Table 6, the processability-improving effect of the pentaerythritol could be obtained simply by mixing the resin as a main raw material with the masterbatch containing pentaerythritol microparticles, which was previously prepared so that 70% or more of them had a particle diameter of 100 μm or less, and directly feeding the resulting mixture into an apparatus for secondary processing such as injection molding without melt-kneading the mixture.

Example 19

A masterbatch B6 was prepared in the same manner as in Example 1 except that the polyester resin as Raw Material A4 was used instead of the polyhydroxyalkanoate as Raw Material A1. In the masterbatch, 70% or more of the total pentaerythritol particles had a particle diameter of 100 μm or less.

TABLE 7

| | | | Example 19 B6 |
| --- | --- | --- | --- |
| Raw Materials | Polyester Resin (A4) | Parts by weight | 100 |
| | Pentaerythritol | Parts by weight | 43 |
| Pentaerythritol Content | | wt % | 30 |
| Resin Temperature during Melt-Kneading | | ° C. | 185 |
| Ratio of Particles with Particle Diameter ≤ 100 μm | | % | 97.7 |

Comparative Example 8

A resin composition having a pentaerythritol content of 30% was obtained in the same manner as in Example 19 except that the melt-kneading of the polyester resin as Raw Material A4 and the pentaerythritol was performed under conditions of a preset temperature of 110 to 130° C. and a screw rotation speed of 50 rpm. The ratio of pentaerythritol particles having a particle diameter of 100 μm or less in the obtained resin composition was 58.5%.

TABLE 8

| | | | Comparative Example 8 |
| --- | --- | --- | --- |
| Raw Materials | Polyester Resin (A4) | Parts by weight | 100 |
| | Pentaerythritol | Parts by weight | 43 |
| Pentaerythritol Content | | wt % | 40 |
| Resin Temperature during Melt-Kneading | | ° C. | 152 |
| Ratio of Particles with Particle Diameter ≤ 100 μm | | % | 58.5 |

Examples 20 to 22

The polyhydroxyalkanoate as Raw Material A1 and the masterbatch B6 obtained in Example 19 were mixed in a mixing ratio shown in Table 9 and directly fed into an injection molding machine to evaluate injection molding processability in the same manner as in Example 4. The results are shown in Table 9.

Comparative Examples 9 to 11

The resin composition obtained in Comparative Example 8 and the polyhydroxyalkanoate as Raw Material A1 were mixed so that the resulting mixture had a pentaerythritol content shown in Table 9, and the mixture was directly subjected to injection molding and injection molding processability was evaluated in the same manner as in Examples 20 to 22. The results are shown in Table 9.

TABLE 9

|  |  |  | Examples | | | Comparative Examples | | |
| --- | --- | --- | --- | --- | --- | --- | --- | --- |
|  |  |  | 20 | 21 | 22 | 9 | 10 | 11 |
| Raw Materials | Polyhydroxyalkanoate (A1) | Parts by weight | 98.3 | 96.6 | 83.3 | — | 100 | — |
|  | Masterbatch (B6) | Parts by weight | 1.7 | 3.4 | 16.7 | — | — | — |
|  | Resin Composition Obtained in Comparative Example 8 | Parts by weight | — | — | — | 1.7 | 3.4 | 16.7 |
| Pentaerythritol Content of Final Resin Composition |  | % | 0.5 | 1.0 | 5.0 | 0.5 | 1.0 | 5.0 |
| Ratio of Particles with Particle Diameter ≤100 μm |  | % | 97.7 | 97.7 | 97.7 | 58.5 | 58.5 | 58.5 |
| Injection Molding | Mold Temperature | ° C. | 50 | 50 | 51 | 50 | 51 | 51 |
|  | Release Time | Seconds | 21 | 20 | 14 | 47 | 42 | 35 |

As can be seen from Table 9, when the ratio of pentaerythritol particles having a particle diameter of 100 μm or less was less than 70%, the effect of pentaerythritol addition could not be obtained simply by mixing the resin as a main raw material with the pentaerythritol and directly feeding the resulting mixture into an apparatus for secondary processing such as injection molding. On the other hand, according to the present invention, the effect of the pentaerythritol as a nucleating agent could be obtained simply by mixing the resin as a main raw material with pentaerythritol microparticles previously prepared so that 70% or more of them had a particle diameter of 100 μm or less and directly feeding the resulting mixture into an apparatus for secondary processing such as injection molding without melt-kneading the mixture.

The invention claimed is:

1. A resin composition comprising:
a thermoplastic resin (A); and
a plurality of pentaerythritol particles (B),
wherein 70% or more of the pentaerythritol particles (B) have a particle diameter of 100 μm or less, wherein an amount of the pentaerythritol particles (B) in the resin composition is from 15 parts by weight to 400 parts by weight based on 100 parts be weight of the thermoplastic resin (A), and wherein the thermoplastic resin (A) is a polyhydroxyalkanoate.

2. The resin composition according to claim 1, wherein the thermoplastic resin (A) is at least one selected from the group consisting of poly(3-hydroxybutyrate), poly(3-hydroxybutyrate-co-3-hydroxyvalerate), poly(3-hydroxybutyrate-co-3-hydroxyvalerate-co-3-hydroxyhexanoate), poly(3-hydroxybutyrate-co-3-hydroxyhexanoate), and poly(3-hydroxybutyrate-co-4-hydroxybutyrate).

3. A molding resin composition produced by a process comprising mixing the resin composition according to claim 1 with a thermoplastic resin (C).

4. The molding resin composition according to claim 3, wherein the thermoplastic resin (C) is at least one selected from the group consisting of an aromatic polyester and an aliphatic polyester.

5. The molding resin composition according to claim 3, wherein the thermoplastic resin (C) is a polyhydroxyalkanoate.

6. A method for producing the resin composition according to claim 1, the method comprising:
melt-kneading the thermoplastic resin (A) and a raw material of the pentaerythritol particles (B) at 170° C. or higher such that a melt-kneaded material is obtained; and
cooling the melt-kneaded material such that the resin composition comprising the thermoplastic resin (A) and the pentaerythritol particles (B) is obtained.

7. A method for producing the resin composition according to claim 1, the method comprising:
mixing the thermoplastic resin component (A) and the pentaerythritol particles (B).

8. A method for producing a molded article comprising the molding resin composition according to claim 3, the method comprising:
feeding a mixture comprising the resin composition and the thermoplastic resin (C) into a molding machine to mold the mixture.

9. A resin molded article produced by a process comprising molding the resin composition according to claim 1.

10. The resin composition according to claim 1, wherein 95% or more of the pentaerythritol particles (B) have a particle diameter of 100 μm or less.

11. The molding resin composition according to claim 5, wherein the pentaerythritol particles (B) are contained in an amount of from 0.05 to 12 parts by weight based on 100 parts by weight of a total resin content of the molding resin composition.

12. The molding resin composition according to claim 5, wherein the pentaerythritol particles (B) are contained in an amount of from 0.5 to 8 parts by weight based on 100 parts by weight of a total resin content of the molding resin composition.

13. The method according to claim 6, wherein 80% or more of the pentaerythritol particles (B) have a particle diameter of 100 μm or less.

14. The method according to claim 6, wherein 95% or more of the pentaerythritol particles (B) have a particle diameter of 100 μm or less.

15. The method according to claim 7, wherein 95% or more of the pentaerythritol particles (B) have a particle diameter of 100 μm or less.

16. A method for producing a molded article comprising the molding resin composition according to claim 5, the method comprising:
feeding a mixture comprising the resin composition and the thermoplastic resin (C) into a molding machine to mold the mixture.

17. The method according to claim 16, wherein the molding resin composition comprises the pentaerythritol particles (B) in an amount of from 0.05 to 12 parts by weight based on 100 parts by weight of a total resin content of the molding resin composition.

18. The method according to claim 16, wherein the molding resin composition comprises the pentaerythritol particles (B) in an amount of from 0.5 to 8 parts by weight based on 100 parts by weight of a total resin content of the molding resin composition.

19. The resin composition according to claim 1, wherein the amount of the pentaerythritol particles (B) in the resin composition is from 43 parts by weight to 400 parts by weight based on 100 parts by weight of the thermoplastic resin (A).

20. The method according to claim 8, comprising directly feeding the mixture into the molding machine to mold the mixture without performing melt-kneading.

* * * * *